(12) United States Patent
Palla et al.

(10) Patent No.: US 9,183,294 B2
(45) Date of Patent: Nov. 10, 2015

(54) META-DATA APPROACH TO QUERYING MULTIPLE BIOMEDICAL ONTOLOGIES

(75) Inventors: Ravi Kiran Reddy Palla, Plainsboro, NJ (US); Dan G. Tecuci, Plainsboro, NJ (US); Vinay Damodar Shet, Princeton, NJ (US); Mathaeus Dejori, New York, NY (US)

(73) Assignee: Siemens Aktiengesellschaft, Munich (DE)

( * ) Notice: Subject to any disclaimer, the term of this patent is extended or adjusted under 35 U.S.C. 154(b) by 367 days.

(21) Appl. No.: 13/442,124

(22) Filed: Apr. 9, 2012

(65) Prior Publication Data

US 2012/0259885 A1 Oct. 11, 2012

Related U.S. Application Data

(60) Provisional application No. 61/473,269, filed on Apr. 8, 2011, provisional application No. 61/482,660, filed on May 5, 2011.

(51) Int. Cl.
*G06F 17/30* (2006.01)

(52) U.S. Cl.
CPC ................................ *G06F 17/30734* (2013.01)

(58) Field of Classification Search
CPC ........................... G06F 30/02; G06F 17/30867
USPC ......... 707/769, 104, 739, 723, 741, 718, 737; 703/6
See application file for complete search history.

(56) References Cited

U.S. PATENT DOCUMENTS

| | | | |
|---|---|---|---|
| 7,027,055 B2* | 4/2006 | Anderson et al. | 345/473 |
| 2003/0061200 A1* | 3/2003 | Hubert et al. | 707/3 |
| 2006/0074980 A1* | 4/2006 | Sarkar | 707/104.1 |
| 2008/0313229 A1* | 12/2008 | Taswell | 707/104.1 |
| 2010/0057815 A1* | 3/2010 | Spivack et al. | 707/794 |
| 2010/0100546 A1* | 4/2010 | Kohler | 707/739 |
| 2010/0121885 A1* | 5/2010 | Hosomi et al. | 707/794 |
| 2011/0047149 A1* | 2/2011 | Vaananen | 707/723 |
| 2012/0078595 A1* | 3/2012 | Balandin et al. | 703/6 |

\* cited by examiner

*Primary Examiner* — Jeffrey A Burke
*Assistant Examiner* — Thong Vu

(57) ABSTRACT

A method for retrieving information spread across a plurality of different ontologies, including: defining a meta-ontology, wherein the meta-ontology includes high-level properties and their mappings to specific properties defined in a plurality of different ontologies; receiving a question, wherein the question is associated with a high-level property; and providing an answer to the question, wherein the answer is determined by using the meta-ontology.

21 Claims, 2 Drawing Sheets

META-DATA APPROACH TO QUERYING MULTIPLE BIOMEDICAL ONTOLOGIES

CROSS-REFERENCE TO RELATED APPLICATIONS

This application claims priority under 35 U.S.C. §119 to U.S. provisional application No. 61/473,269 filed Apr. 8, 2011 and U.S. provisional application No. 61/482,660 filed May 5, 2011, the disclosures of which are incorporated by reference herein in their entireties.

BACKGROUND OF THE INVENTION

1. Technical Field

The present invention relates to accessing information spread across multiple ontologies for the purpose of performing reasoning tasks.

2. Discussion of the Related Art

Ontologies are rich sources of information that can be exploited for performing reasoning tasks. An example application is the use of biomedical ontologies for reasoning within question answering (QA) systems to assist physicians in making the correct diagnosis and prescribing the right medication. Such a QA system needs to have sufficient access to information regarding anatomy, pathology, pharmacology, and other related domains. While there are ontologies that cater to each of these individual domains, there is no ontology that sufficiently covers all these domains. Moreover, the ontologies for the individual domains do not necessarily contain all the information required by QA systems to effectively assist physicians. Therefore, such systems need to both enhance and integrate several biomedical ontologies.

SUMMARY OF THE INVENTION

In an exemplary embodiment of the present invention, there is provided a method for retrieving information spread across a plurality of different ontologies, comprising: defining a meta-ontology, wherein the meta-ontology includes high-level properties and their mappings to specific properties defined in a plurality of different ontologies; receiving a question, wherein the question is associated with a high-level property; and providing an answer to the question, wherein the answer is determined by using the meta-ontology.

The high-level properties are based on a set of questions a system is expected to answer. The high-level properties are mapped to specific properties that provide answers to the expected questions. The high-level properties are represented in a resource description framework description. The meta-ontology includes information about how to generate queries that are used to retrieve information associated with the high-level properties from the ontologies. The queries include SPARQL queries. Some of the high-level properties are defined for retrieving synonyms of particular entities from the ontologies such that the same concept represented as different entities in different ontologies can be identified. The ontologies include medical ontologies. The method further comprises integrating a new ontology into the meta-ontology by updating the meta-ontology.

In an exemplary embodiment of the present invention, there is provided a system, comprising: a memory device for storing a program; a processor in communication with the memory device, the processor operative with the program to: define a meta-ontology, wherein the meta-ontology includes high-level properties and their mappings to specific properties defined in a plurality of different ontologies; receive a question, wherein the question is associated with a high-level property; and provide an answer to the question, wherein the answer is determined by using the meta-ontology.

The high-level properties are based on a set of questions the system is expected to answer. The high-level properties are mapped to specific properties that provide answers to the expected questions. The high-level properties are represented in a resource description framework description. The meta-ontology includes information about how to generate queries that are used to retrieve information associated with the high-level properties from the ontologies. Some of the high-level properties are defined for retrieving synonyms of particular entities from the ontologies such that the same concept represented as different entities in different ontologies can be identified.

In an exemplary embodiment of the present invention, there is provided a computer program product, comprising: a non-transitory computer readable storage medium having computer readable program code embodied therewith, the computer readable program code comprising: computer readable program code configured to perform the steps of: defining a meta-ontology, wherein the meta-ontology includes high-level properties and their mappings to specific properties defined in a plurality of different ontologies; receiving a question, wherein the question is associated with a high-level property; and providing an answer to the question, wherein the answer is determined by using the meta-ontology.

The high-level properties are based on a set of questions a system is expected to answer. The high-level properties are mapped to specific properties that provide answers to the expected questions. The high-level properties are represented in a resource description framework description. The meta-ontology includes information about how to generate queries that are used to retrieve information associated with the high-level properties from the ontologies. Some of the high-level properties are defined for retrieving synonyms to particular words from the ontologies such that the same entity represented in different ontologies can be identified.

DETAILED DESCRIPTION OF EXEMPLARY EMBODIMENTS

Figure 1:
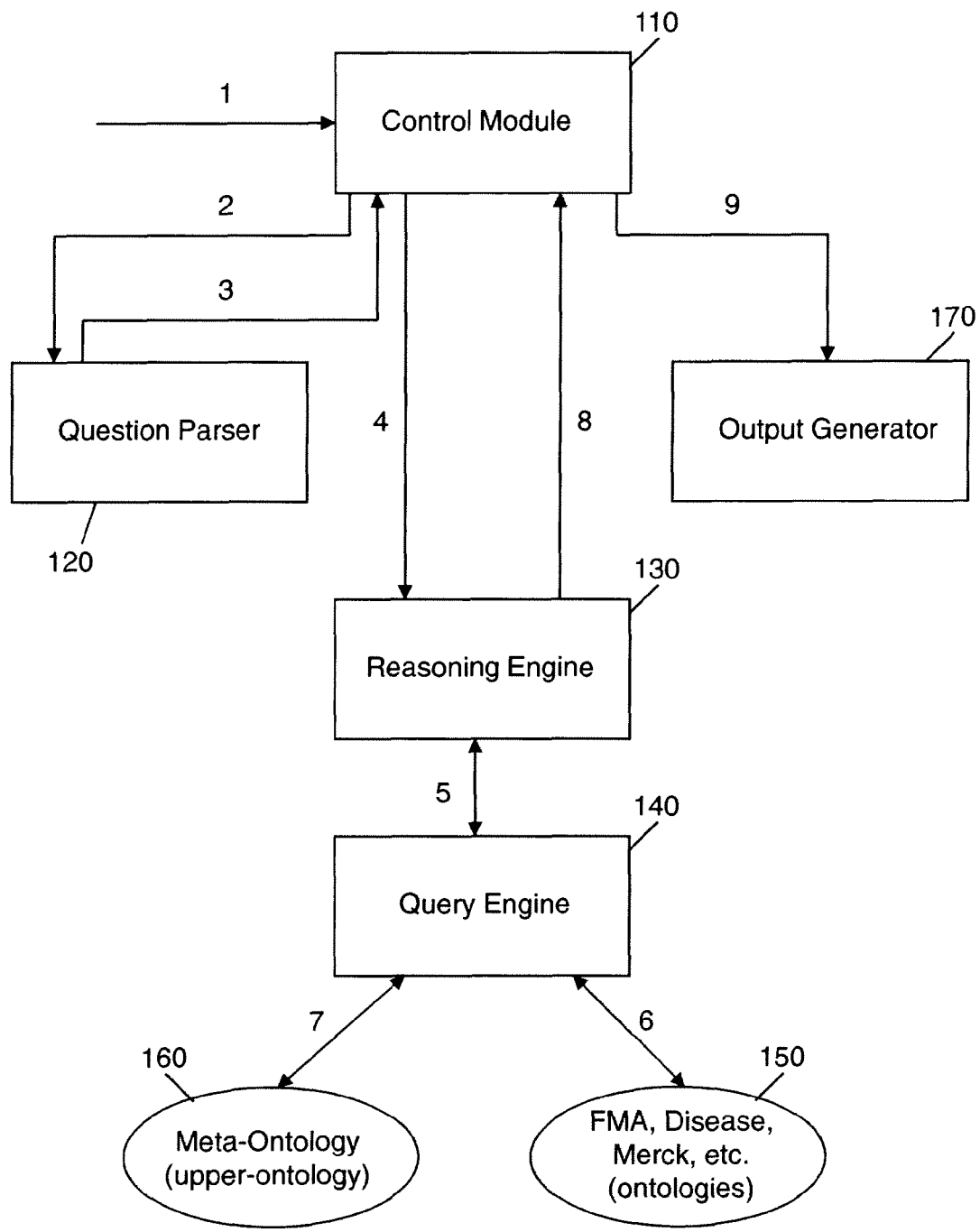
FIG. 1 illustrates a question answering (QA) system and its flow according to an exemplary embodiment of the present invention.

In accordance with an exemplary embodiment of the present invention, presented herein is a method for retrieving information that is spread across multiple ontologies in the context of building a question answering (QA) system. The method involves ontology integration and run-time SPARQL query generation, both of which are accomplished by defining a meta-ontology that contains information about various properties in the ontologies, the mapping between the properties, and information needed to generate SPARQL queries for retrieving information with respect to these properties. The method abstracts away the actual ontologies as it refers only to the meta-ontology to retrieve the required information. This implies that new ontologies can be integrated into the system by simply updating the meta-ontology. The method also allows for interoperability between ontologies at the level of ontology alignment. The method may be appropriate for QA systems that rely on several large ontologies.

The method was tested by considering the Foundational Model of Anatomy (FMA) ontology, the human disease ontology, and an ontology that represents certain information from the Merck manual. The meta-data used is tailored for QA systems, but the method itself can be applied to other applications.

In the method, a set of high-level properties based on the types of questions to be answered is defined and an upper ontology that maps these high-level properties to properties from individual ontologies is created. The mapping is not necessarily one-to-one and can be many-to-many. The mapping between the properties of individual ontologies can be derived from their mapping to the high-level properties. As an example, consider the case of answering questions of the form "What is a [concept-name]?" For this, a high-level property "definition" is defined and the upper ontology is updated to include the mapping between "definition" and the properties of the individual ontologies that provide an appropriate answer for a definitional question.

Given this, in order to retrieve the uniform resource identifier (URI)refs of all properties necessary to answer definitional questions, the system can simply query the upper ontology. However, just retrieving these URIrefs is not sufficient to answer a question and correct queries need to be formulated to retrieve the appropriate definitions. In order to formulate the queries, the knowledge of the structure of the underlying ontologies is required; this information can also be included in the upper ontology. The following resource description framework (RDF) description shows a possible mapping from the high-level property "definition" to the property providing definitions in the disease ontology. It is to be understood that other resource description formats may be used here, such as text-based (HTML, XML), or graphical (entity relationship, object role model). This description also contains the necessary information to generate the SPARQL queries that can be used to retrieve the definitions. OBOINOWL is an abbreviation for www.geneontology.org/formats/oboInOwl.

```
<rdf:Description rdf:about="OBOINOWL#hasDefinition">
    <hasProperty>definition</hasProperty>
    <hasQueryTarget>def</hasQueryTarget>
    <hasQueryLine>?x.    ?x rdfs:label ?def.</hasQueryLine>
</rdf:Description>
```

The above is an example of the meta-data that is represented in the upper ontology. It encodes two things:
how a high-level property like "definition" is represented in a specific ontology (in this case, OBOINOWL#hasDefinition, which means the property "hasDefinition," described in the ontology "OBOINOWL"),

```
<rdf:Description rdf:about="OBOINOWL#hasDefinition">
    <hasProperty>definition</hasProperty>
``` and how a SPARQL query fragment can be used to retrieve that information,

```
<hasQueryTarget>def</hasQueryTarget>
    <hasQueryLine>?x.    ?x rdfs:label ?def.</hasQueryLine>
```

Note that multiple properties in specific ontologies can map to one high-level property in the upper ontology. This mapping process abstracts away specific ways in which different ontologies encode properties.

The description above indicates that the SPARQL queries needed to retrieve definitions from the disease ontology are of the form

```
SELECT ?def WHERE {
[subject]  <OBOINOWL#hasDefinition>  ?x.
?x  rdfs:label  ?def.
}
``` where "[subject]" is the URIref of the concept in the disease ontology whose definition has to be retrieved. More specifically, this shows how the above meta-data is translated into executable code (in this case SPARQL language) that can retrieve the information corresponding to the high-level definition from a particular ontology (in this case OBOINOWL). Note that "?x. ?x rdfs:label ?def ." corresponds exactly to the query fragment encoded in the RDF above.

The method presented so far assumes that all the URIrefs corresponding to the concept names in the user's question have been identified. However, this is not trivial since different ontologies might refer to a concept using different names, and the user can use any of these names in the question. For example, the Merck manual ontology contains the definition for "Atrioventricular block" while the user might formulate the question as "What is a AV block?" The disease ontology contains the name "AV block" as a synonym for "Atrioventricular block" but does not contain the definition. So, if the system only gets the URIrefs corresponding to the name "AV block," it will not be able to answer the question. In order to deal with such situations and be able to answer the question, the system needs to retrieve the URIrefs corresponding to the "Atrioventricular block" in the Merck manual ontology. This can be done by first retrieving the synonyms of "AV block" from the disease ontology and then using them to obtain the corresponding URIrefs from the Merck manual ontology. In general, to answer any question about a concept, the system needs to first retrieve all the synonyms of the concept name used in the question and then use them to retrieve the corresponding URIrefs. This is what allows for ontology interoperability at the level of ontology alignment.

However, since different ontologies have different structures, querying for the synonyms is not straightforward. To address this, the present invention defines a high-level property "synonym" and uses the upper ontology to represent information about querying for synonyms. The following description shows one way to represent information about retrieving synonyms from the disease ontology.

```
<rdf:Description rdf:about="OBOINOWL#hasExactSynonym">
    <hasProperty>synonym</hasProperty>
    <hasQueryTarget>syn</hasQueryTarget>
    <hasQueryLine>?x.    ?x rdfs:label ?syn.</hasQueryLine>
</rdf:Description>
```

Here, it is described how the high-level property "synonym" corresponds to the specific property "hasExactSynonym" from the "OBOINOWL" ontology.

In order to obtain the synonyms, the system can query the upper ontology to retrieve all the information required to formulate the SPARQL queries needed to retrieve the synonyms.

A prototype QA system that uses the method of the present invention to query multiple biomedical ontologies was implemented. The system answers questions of the form "What is a [concept-name]?" and "What is/are the [relation-name(s)] of the [concept-name]?" With respect to such questions high-level properties such as "definition," "part," "location," "connections" and "affected-organs" were defined, so that questions, such as "What is the location of the heart?" and "What are the affected organs of atrial fibrillation?" could be asked and answered.

The table below shows some of the mappings for the high-level properties discussed above. In the table, fma stands for the Foundational Model of Anatomy ontology, oboInOwl stands for OBO format metamodel, rdfs stands for an RDF schema and merck stands for an ontology that represents certain information from the Merck manual.

| High-Level Property | Mapped To |
| --- | --- |
| definition | fma:definition, oboInOwl:hasDefinition, fma:location, merck:hasDefinition, fma:surrounded_by, rdfs:subClassOf |
| location | fma:location, fma:surrounded_by, fma:contained_in |

The table suggests that in order to answer definitional questions of the form "What is a [organ]?" the system also retrieves information about the type of the organ and some information about the location of the organ. This is another advantage of the method as it enables different information to be retrieved by simply adding/deleting certain mappings.

The architecture of the QA system according to an exemplary embodiment of the present invention is shown in FIG. 1. In FIG. 1, rectangular boxes represent modules of the system and oval boxes represent ontologies. Control module 110 controls the entire QA process. The working of the system will be illustrated with the help of the example question "What is an AV block?" This question may be input to the control module 110 by a user (path 1). The user's question is passed (path 2) to a natural language parser/question parser 120 that extracts the reasoning task that needs to be performed, the concept and the high-level property corresponding to the information that needs to be retrieved in order to perform the task. This information is provided to the control module 110 (path 3). For the particular question considered, the question parser 120 recognizes that the question is about the concept "AV block" and the high-level property "definition." In addition, the question parser 120 recognizes that the reasoning type is "retrieval." A reasoning engine 130 is invoked with these as input (path 4).

The reasoning engine 130 retrieves the URI corresponding to the label "AV block" from ontologies 150 (path 5 and 6). The ontology access is via a query engine 140 which varies depending on the triple store used. Once the URI is obtained, the reasoning engine 130 queries meta-ontology 160 to obtain the information required to formulate the SPARQL queries needed to retrieve the synonyms (paths 5 and 7). Using this information and the concept URI, the reasoning engine 130 formulates the SPARQL queries and uses them to retrieve all the synonyms of "AV block" and the corresponding URIs from the ontologies 150 (paths 5 and 6). At this point, the reasoning engine 130 has all the concept URIs required to retrieve the definition of "AV block." In order to actually retrieve the definition, the reasoning engine 130 queries the meta-ontology 160 and obtains the query information required to formulate the SPARQL queries needed to obtain the definitions (paths 5 and 7). Using this information and the concept URIs obtained so far, the reasoning engine 130 formulates all the necessary SPARQL queries. Finally, the reasoning engine 130 uses these queries to retrieve all the definitions of "AV block" (paths 5 and 6).

With respect to the specific ontologies considered, the disease ontology contains "AV block" as a synonym of "Atrioventricular block" but does not contain the definition. However, the Merck manual ontology contains the definition for "Atrioventricular block." When the reasoning engine 130 obtains all the synonyms of "AV block" and the corresponding URIs, it obtains "Atrioventricular block" as a synonym from the disease ontology and, as a result, it obtains among other URIs, the concept URI corresponding to "Atrioventricular block" in the Merck manual ontology. When the reasoning engine 130 obtains the query information for retrieving the definitions, it obtains among others, the query information needed to obtain the definitions from the Merck manual ontology. Finally, when the reasoning engine 130 formulates the SPARQL queries and runs them, it obtains the definition of "Atrioventricular block" from the Merck manual ontology. The definition is then provided to the user (paths 8 and 9).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
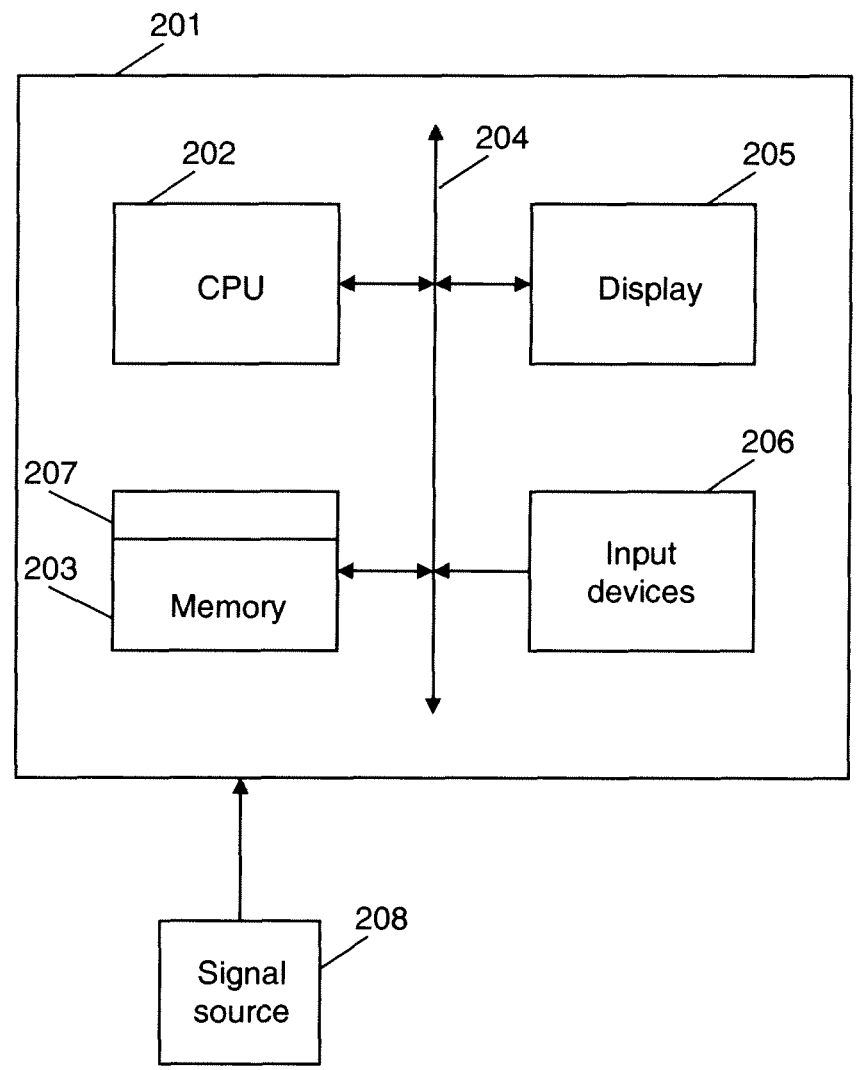
FIG. 2 illustrates a computer system in which an exemplary embodiment of the present invention may be implemented.

Referring now to FIG. 2, according to an exemplary embodiment of the present invention, a computer system 201 can comprise, inter alia, a central processing unit (CPU) 202, a memory 203 and an input/output (I/O) interface 204. The computer system 201 is generally coupled through the I/O interface 204 to a display 205 and various input devices 206 such as a mouse and keyboard. The support circuits can include circuits such as cache, power supplies, clock circuits, and a communications bus. The memory 203 can include RAM, ROM, disk drive, tape drive, etc., or a combination thereof. Exemplary embodiments of present invention may be implemented as a routine 207 stored in memory 203 (e.g., a non-transitory computer-readable storage medium) and executed by the CPU 202 to process the signal from a signal source 208. As such, the computer system 201 is a general-purpose computer system that becomes a specific purpose computer system when executing the routine 207 of the present invention.

The computer system 201 also includes an operating system and micro-instruction code. The various processes and functions described herein may either be part of the micro-instruction code or part of the application program (or a combination thereof) which is executed via the operating system. In addition, various other peripheral devices may be connected to the computer system 201 such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A method for retrieving information spread across a plurality of different ontologies, comprising:
   defining a meta-ontology, wherein the meta-ontology includes high-level properties and their mappings to specific properties defined in a plurality of different ontologies;
   receiving a question, wherein the question is associated with a high-level property; and providing an answer to the question, wherein the answer is determined by referring only to the meta-ontology to retrieve required information, and in answering a question about a concept, synonyms of the concept's name used in the question are retrieved, and then, the synonyms are used to retrieve corresponding uniform resource identifiers, wherein a synonym is a high-level property included in a resource description framework description of each of the ontologies, wherein the resource description framework description of a first ontology of the ontologies describes how a first synonym corresponds to a first property from the first ontology and how the first synonym is queried such that the first synonym can be retrieved from the first ontology.

2. The method of claim 1, wherein the high-level properties are based on a set of questions a system is expected to answer.

3. The method of claim 2, wherein the high-level properties are mapped to specific properties that provide answers to the expected questions.

4. The method of claim 1, wherein the high-level properties are represented in a resource description framework description.

5. The method of claim 1, wherein the meta-ontology includes information about how to generate queries that are used to retrieve information associated with the high-level properties from the ontologies.

6. The method of claim 5, wherein the queries include SPARQL queries.

7. The method of claim 1, wherein some of the high-level properties are defined for retrieving synonyms of particular entities from the ontologies such that the same concept represented as different entities in different ontologies can be identified.

8. The method of claim 1, wherein the ontologies include medical ontologies.

9. The method of claim 1, further comprising integrating a new ontology into the meta-ontology by updating the meta-ontology.

10. A system, comprising:
a memory device for storing a program;
a processor in communication with the memory device, the processor operative with the program to:
define a meta-ontology, wherein the meta-ontology includes high-level properties and their mappings to specific properties defined in a plurality of different ontologies;
receive a question, wherein the question is associated with a high-level property; and
provide an answer to the question, wherein the answer is determined by referring only to the meta-ontology to retrieve required information, and in answering a question about a concept, synonyms of the concept's name used in the question are retrieved, and then, the synonyms are used to retrieve corresponding uniform resource identifiers,
wherein a synonym is a high-level property included in a resource description framework description of each of the ontologies,
wherein the resource description framework description of a first ontology of the ontologies describes how a first synonym corresponds to a first property from the first ontology and how the first synonym is queried such that the first synonym can be retrieved from the first ontology.

11. The system of claim 10, wherein the high-level properties are based on a set of questions the system is expected to answer.

12. The system of claim 11, wherein the high-level properties are mapped to specific properties that provide answers to the expected questions.

13. The system of claim 10, wherein the high-level properties are represented in a resource description framework description.

14. The system of claim 10, wherein the meta-ontology includes information about how to generate queries that are used to retrieve information associated with the high-level properties from the ontologies.

15. The system of claim 10, wherein some of the high-level properties are defined for retrieving synonyms of particular entities from the ontologies such that the same concept represented as different entities in different ontologies can be identified.

16. A computer program product, comprising:
a non-transitory computer readable storage medium having computer readable program code embodied therewith, the computer readable program code comprising:
computer readable program code configured to perform the steps of:
defining a meta-ontology, wherein the meta-ontology includes high-level properties and their mappings to specific properties defined in a plurality of different ontologies;
receiving a question, wherein the question is associated with a high-level property; and
providing an answer to the question, wherein the answer is determined by referring only to the meta-ontology to retrieve required information, and in answering a question about a concept, synonyms of the concept's name used in the question are retrieved, and then, the synonyms are used to retrieve corresponding uniform resource identifiers,
wherein a synonym is a high-level property included in a resource description framework description of each of the ontologies,
wherein the resource description framework description of a first ontology of the ontologies describes how a first synonym corresponds to a first property from the first ontology and how the first synonym is queried such that the first synonym can be retrieved from the first ontology.

17. The computer program product of claim 16, wherein the high-level properties are based on a set of questions a system is expected to answer.

18. The computer program product of claim 17, wherein the high-level properties are mapped to specific properties that provide answers to the expected questions.

19. The computer program product of claim 16, wherein the high-level properties are represented in a resource description framework description.

20. The computer program product of claim 16, wherein the meta-ontology includes information about how to generate queries that are used to retrieve information associated with the high-level properties from the ontologies.

21. The computer program product of claim 16, wherein some of the high-level properties are defined for retrieving synonyms of particular entities from the ontologies such that the same concept represented as different entities in different ontologies can be identified.

* * * * *